United States Patent [19]

Hodgdon

[11] Patent Number: 5,137,925
[45] Date of Patent: Aug. 11, 1992

[54] ALIPHATIC ANION EXCHANGE POLYMERIC MEMBRANES HAVING IMPROVED RESISTANCE TO FOULING

[75] Inventor: Russell B. Hodgdon, Concord, Mass.

[73] Assignee: Ionics, Incorporated, Watertown, Mass.

[21] Appl. No.: 667,508

[22] Filed: Mar. 11, 1991

[51] Int. Cl.⁵ .............................................. C08J 5/22
[52] U.S. Cl. .................................. 521/27; 521/30; 521/32; 521/36; 525/235; 525/242; 526/344
[58] Field of Search ................ 521/27, 30, 32, 36

[56] References Cited

U.S. PATENT DOCUMENTS 3,563,921  2/1971  Bourat .................................. 521/27
4,058,491  11/1977  Steckler ............................... 521/32

Primary Examiner—Joseph L. Schofer
Assistant Examiner—Fred Zitomer
Attorney, Agent, or Firm—Norman E. Saliba

[57] ABSTRACT

Ion exchange membranes of the all-aliphatic structural variety, are made from plastisol films of polyvinyl chloride (PVC) and its copolymers coupled through the nitrogen atom with an aliphatic vinyl monomer containing a tertiary nitrogen atom or a polymer or copolymer of such a monomer such membrane subsequently, quaternized with an alkyl halide.

6 Claims, No Drawings

ALIPHATIC ANION EXCHANGE POLYMERIC MEMBRANES HAVING IMPROVED RESISTANCE TO FOULING

The present invention relates to anion exchange membranes formed preferably from a vinyl chloride polymer or copolymer. Such anion exchange membranes show outstanding resistance to polyanion foulant during the electrodialysis (desalting) of natural waters and improved resistance to chlorine oxidation in comparison to conventional aryl-alkyl based anion exchange membranes or ion exchange resins.

Several attempts have been made to prepare anion exchange membranes as well as their cation exchange membrane counterparts, by dispersing finely divided particles of an ion exchange material in a polymeric binder. These membranes (called heterogeneous membranes) have numerous disadvantages which in most cases arise from their macro-sized, non uniform particle structure. It is in fact difficult for the ion exchange particles to be dispersed uniformly in the polymer binder. As a consequence of this, there is created in the membrane, zones with high concentrations of ion exchange groups and zones with low concentrations of these same groups. This leads not only to inequalities in the ion transport or exchange through the membrane but also to ionic conductance interruptions from one side of the membrane to the other when employed in an electric field (electrodialysis). These inequalities also lead to serious strains and tensions, which cause irregular rippling and washboard surfaces to occur in the membrane.

In order to overcome these disadvantages, it is disclosed herein to attach (without the use of radiation or free radical grafting) via quaternization (alkylation), aliphatic ion exchange monomers, polymers, or copolymers directly onto the polymeric chains of the base polymeric film itself. This objective has been achieved by quaternizing an aliphatic monomer, polymer, or copolymer containing one to several tertiary amine groups with a halide carbon of the polyvinyl chloride (PVC) film whence quaternary ammonium anion exchange group is formed by direct addition, thus creating a polymeric quaternary ammonium chloride. Where a tertiary amine aliphatic monomer is used the ion exchange film is subsequently crosslinked by polymerization of the coupled amine monomer via polymerization of its vinyl group, preferably in the presence of a divinyl monomer like divinyl benzene using an azo catalyst and heat. The aforementioned crosslinking step aids in restricting water imbibition when water is taken up by the ion exchange film.

It is known in the art to prepare ion exchange membranes by casting homogeneous solutions of a film forming polymer or copolymer (i.e. polystyrene-butadiene) and a polyelectrolyte (for example N-methyl 4-vinyl pyridinium chloride polymer). However, the membrane is usually unsatisfactory, because the mixed polyelectrolyte is not bonded to the film forming polymer and can be slowly extracted from the membrane while in use. This results not only in the anion exchange membrane losing its conductivity (as well as other ion exchange features) but also the adding of contaminants (the extracted polyelectrolyte) to the process product.

It has now been found that aliphatic ion-exchange membranes having excellent mechanical properties and good flexibility (and from which the polyelectrolyte cannot be extracted) can be made from a vinyl chloride polymer or copolymer coupled through the nitrogen atoms with an aliphatic vinyl monomer containing covalently bound tertiary amine groups, or of a polymer of vinyl chloride and a polymer of an aliphatic monomer containing covalently bound tertiary amine groups, where at least part of the said tertiary amine groups have been quaternized by the vinyl chloride polymer or copolymer. Preferably, these novel membranes are made by first preparing a paste of the vinyl chloride polymer or copolymer and the aliphatic tertiary amine vinyl monomer, adding a polyvinyl chloride compatible plasticizer, and a catalyst, then heating this paste at high temperature after it has been dispersed by itself or heating after it has been put onto woven or non-woven fabric and contained between plastic lined glass plates. After polymerization of the paste, the resulting polymerizate is removed from the plastic lined glass plates and reacted in a methyl alcohol bath of saturated methyl chloride for several hours. The bath will convert non-coupled tertiary amines into a quaternary ammonium chloride groups.

During polymerization, the tertiary amine groups of the vinyl monomer couple directly, in part, with a portion of the vinyl chloride halogens to form quaternary ammonium chloride groups, said tertiary amine vinyl monomers attaching themselves covalently to the backbone of the polyvinyl chloride polymer chains as shown below:

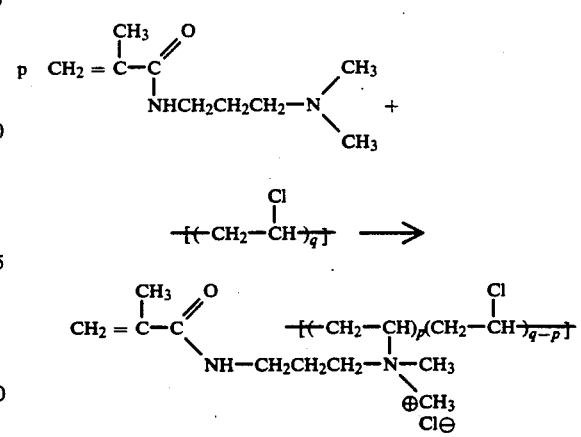

Vinyl polymerization of the coupled quaternary ammonium chloride vinyl groups plus non-coupled tertiary amine vinyl monomer with added free radical catalyst completes the synthesis of the polymer system and adds crosslinking to the product.

Matrix (I)

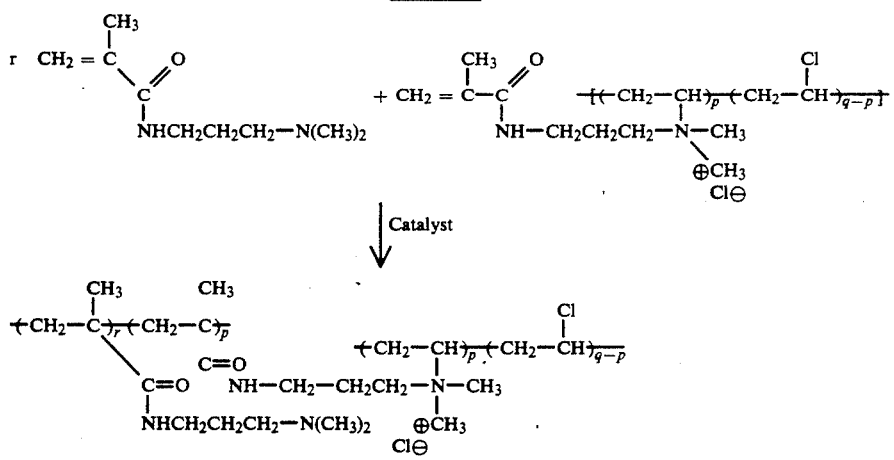

Further reaction of the coupled crosslinked polyelectrolyte with methyl chloride saturated methyl alcohol, quaternizes the tertiary amino group in the r portion of the matrix (I) as shown below:

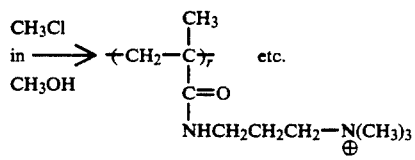

This above three dimensional structure is sufficient to ensure that the polyelectrolyte film (or structure) is insoluble in water, without however causing the membrane to lose its flexibility. The membrane will naturally imbibe a fixed quantity of water and become ionically conductive upon equilibration in same depending upon the degree of crosslinkage built into the polyelectrolyte during its synthesis.

The vinyl chloride polymer or copolymer can be obtained by the usual polymerization procedures. When a vinyl chloride copolymer is used, it must preferably be comprised of a preponderant proportion of vinyl chloride and preferably a molal concentration of at least 0.8 mole fraction of vinyl chloride. The comonomer associated with the vinyl chloride is preferably vinyl acetate. Although it is possible to use vinyl chloride polymers and copolymers of a wide range of molecular weights, the mechanical properties of the resulting membranes and their resistance to alkali media are superior if polymers of high molecular weight are used. Average molecular weights from 5,000 to 250,000 are preferable.

Suitable aliphatic vinyl monomers comprising covalently bonded tertiary amine groups are tertiary amino substituted methacrylate esters acrylate esters, methacrylamides, acrylamides, and vinyl or alkyl substituted tertiary amine groups.

When a copolymer of vinyl chloride coupled with a tertiary amine aliphatic vinyl monomer is used as the film forming material, the content of the tertiary amine in the copolymer monomer in the copolymer can vary within wide limits. Thus, the copolymer can contain from 1% to 99% by weight of vinyl chloride and from 99% to 1% (preferably 40% to 60%) by weight of the tertiary amino aliphatic vinyl monomer both in coupled form and non-coupled form. The latter can be converted to quaternary ammonium halide groups by methylation.

One preferred type of coupled co-polymer is that resulting from the quaternization of the monomer N,N dimethylaminopropylmethacrylamide

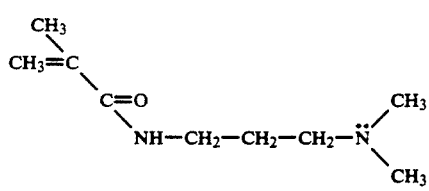

by a vinyl chloride polymer or copolymer by direct alkylation of the tertiary amine with the halide groups of polyvinyl chloride or copolymers of vinyl chloride with other vinyl monomers. This addition does not involve radiation (ionizing or otherwise) or the use of free radical catalysts.

When a mixture of vinyl chloride polymer or copolymer with a polymer of the tertiary amino aliphatic vinyl monomer is used for the preparation of the membrane, the proportion of each of the constituents of the mixture (usually plasticized with a polyvinyl chloride compatible plasticizer) can also vary within wide limits. Thus the proportion of polymer derived from the tertiary amino aliphatic vinyl monomer can be from 1% to 99% by weight, preferably from 40% to 60% by weight, of the mixture.

The membranes of the invention can be obtained by the processes of casting solutions or pastes of the couple polymer or of mixtures of polymers in miscible common solvents, plasticizers, or in the liquid comonomers which are used to couple onto the polyvinyl chloride polymer backbone.

Suitable solvents are N-methyl pyrrolidone, dimethyl formamide, dimethyl acetamide, dimethyl sulfoxide, tetrahydrofuran, cyclohexanone, and gamma-butyrolactone.

Suitable plasticizers are dioctyl phthalate, dibutyl phthalate, diethyl sebacate, tricresyl phosphate, diethyl phosphate, butyl cellosolve and other high boiling point esters.

Instead of forming the membrane by casting a film onto a support, it can be produced by making a paste mixture from the base grafting polymer, plasticizer, a tertiary amine grafting monomer and applying this paste, with 1% azo catalyst, onto a support. Supports are customarily woven fabrics of polyester, 100% acrylic, or polypropylene. Supports may also be nonwoven fabrics of the same types. Subsequent sandwiching of the mix-fabric between plastic lined glass plates and heating at 60–90° C. for periods of one to six hours will form the crosslinked quaternary ammonium membrane polymerizate. Re-inforced membranes having excellent mechanical properties and in particular excellent resistance to tearing are thus obtained.

The solution of a vinyl chloride polymer and a tertiary amino aliphatic vinyl polymer are generally prepared by dissolving each of the polymers in a common solvent. In the case of polymers of N,N dialkyl amino alkyl substituted methacrylates or methacrylamides, the solution can also be obtain by dissolving the vinyl chloride polymer or copolymer (usually along with about 20% of a compatible plasticizer) in an organic solution of the methacrylate or methacrylamide substituted tertiary amino group monomer, followed by heat polymerization (with added azo catalyst) of the latter. The quaternization and polymerization usually take place simultaneously.

The membrane obtained is then treated with an alkyl halide e.g. methyl, ethyl, or n propyl chloride, iodide, or bromide, dimethyl sulfate, or cyclohexyl chloride, bromide, or iodide. The preferred alkylating agent is methyl chloride.

The incorporation of the liquid plasticizer in the membrane has a plasticizing (flexibility) effect on the total polymerizate material of which the membrane is composed and thus increases its flexibility.

The treatment of the membrane with auxiliary quaternizing agent (used only to quaternize unreacted tertiary amino monomers in the polymerizate) is effected by simply soaking the membrane in a saturated solution of the quaternizing agent in methyl alcohol. Other alcohols are also suitable methylation solvents.

The following examples illustrate the invention:

EXAMPLE #1

5 g. of a copolymer of vinyl chloride (0.86 mole fraction) and vinyl acetate (0.14 mole fraction) of average molecular weight of 15,000 Daltons was made into a paste on an open glass plate with 8.3 g. of liquid dimethyl amino propyl methacrylamide, 0.7 g. of 80% divinyl benzene, 1.5 g. of dioctylphthalate (plasticizer) and 0.15 g. azobisisovaleronitrile (catalyst). Dissolution occurred by moving the mass about with a spatula which formed a highly viscous paste capable of being trowelled onto acrylic fabric of 8 mil thickness and roller squeezed between two 3 mil polyethylene terphthalate sheets.

The sandwich was placed between two pieces of 3/16" glass plate and heated at 93° C. for 6 hours whence a brownish black film was obtained upon removing the glass and peeling off the polyester sheeting. This film was strong and water insoluble. The film was divided into two pieces and one portion placed into a saturated solution of methyl chloride in methyl alcohol for three days. The second portion (not methylated) was removed from the water solution and measured for ionic conductance in 0.01N NaCl at 1 kilo Hertz with the following result:

Resistivity=12.9 ohm-cm$^2$

This measurement shows that the tertiary amino methacrylamide monomer had indeed reacted with the halide of the polyvinyl chloride to form a quaternary ammonium polyelectrolyte graft.

This unmethylated second portion of the membrane was then acidified with 2N HCl for 3 hours, washed free of excess acid, placed into 0.01N NaCl whence a resistivity of 10.5 ohm-cm$^2$ was found.

This shows that the unreacted tertiary amino groups which were not grafted to PVC during preparation of the membrane were capable of adding H$^+$Cl$^-$ to further enhance the membranes ionic conductivity as shown below:

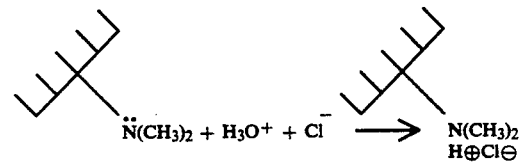

This second piece was washed with excess 1N NH$_4$OH for one hour, equilibrated with 2N NaCl, washed free of chloride ion and brought to equilibrium with 0.01N NaCl whence a resistivity of 12.3 ohm-cm$^2$ was obtained.

This second piece was then reacted 3 days with methyl chloride, was removed from the alcoholic methyl chloride bath and equilibrated in ultrapure (UP) water and finally equilibrated with 0.01N NaCl. Its resistivity measured at 1 kilo Hertz was 4.7 ohm-cm$^2$.

This shows that tertiary amine remained in the prepared membrane and that further quaternization converted remaining tertiary amines to quaternary ammonium chloride polyelectrolytes having good ionic conductance.

EXAMPLE #2

The methylated portion of the membrane prepared in example #1 was cut into four 3"×$\frac{3}{4}$" pieces. Two pieces were stored in 2,000 ppm of sodium hypochlorite (adjusted to a pH of 7.5) for a period of thirty days.

After thirty days storage in continuously replenished 2,000 ppm sodium hypochlorite solution, both pieces were removed, washed with 2N NaCl, water, and finally equilibrated in 0.01N NaCl for 1 hour. Their resistivities were a very good average of 6.3 ohm-cm$^2$, which is evidence that this membrane was somewhat stable to 60,000 ppm days of hypochlorite at a pH of 7.5.

The remaining two samples were placed for 30 days into a solution of 0.1N NaOH, with the solution changed every 3 days. After 30 days, both samples were removed and after washing in 2N HCl to remove excess NaOH, each was washed in 1N ammonium hydroxide for 30 minutes, followed by washing in 2N NaCl for thirty minutes, washing free of Cl$^-$ in distilled water, then finally equilibrated in 0.01N NaCl.

The average resistivity was found to be 4.6 ohm-cm$^2$ at 1k Hertz and is essentially identical to the original membrane resistivity.

This is evidence that this membrane is stable to caustic up to a pH=13.

EXAMPLE #3

Exactly 5 g. of polyvinyl chloride (MW 205,000) was dissolved in 30 ml of N-methyl pyrrolidone.

7.5g of N,N dimethyl amino ethyl methacrylate, 1.25 g. diethyl sebacate and 1 gram of the catalyst azobisisovaleronitrile was dissolved in a separate solution of 50 ml of N methyl pyrrolidone and both solutions blended homogeneously forming a clear solution. A film of the blended solutions was laid down and upon drying yielded a flexible film of good strength. The film was placed between two 3 mil sheets of polyethylene terephthalate which in turn were sandwiched between two 3/16" glass plates which were heated overnight at 65° C. in an explosion proof oven (i.e. 16 hrs). A black film was obtained which was still flexible but tearable if a strong hand force was applied. The film was water insoluble but did not possess outstanding tear strength even when wet. Resistivity was measured and found to be 24.7 ohm-cm$^2$.

The membrane was methylated overnight (in methanol with methyl chloride) equilibrated in water to remove the methanol and then placed in 0.01N NaCl.

Resistivity measured at 1 kilo Hertz was found to be 12.5 ohm-cm$^2$. This is evidence that quaternary ammonium groups were first created by direct reaction of the N,N dimethyl aminoethyl methacrylate with the halide carbons of the polyvinyl chloride chains. The methylation created additional quaternary groups from unreacted tertiary amine.

EXAMPLE #4

5g. of poly N,N,dimethyl amino ethyl methacrylate was dissolved in 60 ml of dimethyl acetamide containing 7 g. of a copolymer of vinyl chloride-vinyl acetate (.9 mol fraction of vinyl chloride) and 1 g. of di-octyl phthalate. The hazy solution formed was cast and a dried film formed which was somewhat transparent and completely flexible. The film was sandwiched as in example #3 and heated in the same manner for 16 hrs.

After stripping away the glass plates and polyethylene terephthalate sheets, a brown film was obtained which was found to be insoluble in cold water. A sample immersed in water for 3 hours was equilibrated in 0.01N NaCl and its resisitivity measured at 1 kilo Hertz.

The resistivity was found to be 48.7 ohm-cm$^2$ which is adequate evidence that the polymers had interacted, to a small degree, to form a quaternary ammonium chloride polyelectrolyte.

EXAMPLE #5

The membrane prepared in example #4 was handleable but did not possess good tear strength. It was found leak free to a methylene blue dye application. A 3"×$\frac{3}{4}$" piece of this membrane was placed into methyl alcohol (saturated with methyl chloride) overnight for sixteen hours. The sample when placed into 0.01N NaCl curled but a resistivity was read at 1 kilo Hertz.

Resistivity (methylated sample) = 20.2 ohm-cm$^2$

EXAMPLE #6

A polyvinyl chloride latex copolymer of polyvinyl chloride-polyvinyl alcohol (.85 mole fraction vinyl chloride) in which the polymer comprised 39% of the latex was combined with 10% of its total weight of N,N,dimethyl amino ethyl methacrylate and 11.7% of its total weight of a 1:1 mixture of dibutyl phthalate-ethylene glycol monobutyl ether. A film of this solution was laid down and air dried. The film obtained was very flexible. The film was cured at 65-70° C. to yield a brownish black film having good strength. The film was equilibrated in water for 1 hour and its resistivity measured after a further equilibration in 0.01N NaCl solution.

Resistivity = 16.6 ohm-cm$^2$

EXAMPLE #7

An ion exchange membrane is prepared by using the same operations as in example #1 except the tertiary amine aliphatic monomer used was N,N dimethyl amino ethyl methacrylate and the fabric was non-woven acrylic with an initial thickness of 10 mils.

The membrane obtained after methylation, had good mechanical strength, was leak free, and had a resistivity measured at one kilo Hertz in 0.01N NaCl of 4.0 ohm-cm$^2$.

EXAMPLE #8

The membrane prepared in example #7 was tested for chlorine and caustic stability as in example #2. In this case the membrane was found to be chlorine tolerant (i.e. resistivity after cleaning-washing and testing in 0.01N NaCl at 1 k-Hertz was found to be 7.2 ohm-cm$^2$) but was found to be unstable to 0.1N NaOH (i.e. resistivity after cleaning-washing and testing in 0.01N NaCl at 1k-Hertz was found to have soared to over 400 ohm-cm$^2$).

While the invention has been described with respect to certain exemplifications and embodiments thereof, the scope is not to be so limited except as in the claims appended hereto.

What is claimed:

1. An anion exchange membrane comprising at least one member of the group consisting of tertiary amine substituted methacrylate esters, tertiary amine substituted acrylate esters, tertiary amine substituted methacrylamides, tertiary amine substituted acrylamides and the polymers and copolymers thereof quaternized at least in part by at least one member of the group consisting of vinyl chloride polymers, vinyl chloride copolymers, chlorinated rubbers, rubber hydrochlorides, chlorobutyl rubbers, bromobutyl rubbers, chlorinated polyethylene rubbers, chlorosulfonated polyethylene rubbers, epichlorohydrin rubbers and neoprene rubbers.

2. An anion exchange membrane comprising at least one member of the group consisting of compounds represented by the formula

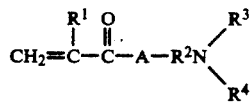

and by the polymers and copolymers thereof where R$^1$ represents a methyl group or hydrogen, A represents —O— or —NH—, R$^2$ represents a saturated alkylene group, R$^3$ and R$^4$ represents alkyl groups, said at least one member quaternized at least in part by one or more members of the group consisting of vinyl chloride polymers, vinyl chloride copolymers, chlorinated rubbers, rubber hydrochlorides, chlorinated rubber hydrochlorides, chlorobutyl rubbers, bromobutyl rubbers, chlorinated polyethylene rubbers, chlorosulfonated polyethylene rubbers, epichlorohydrin rubbers and neoprene rubbers.

3. An anion exchange membrane according to claim 1 wherein said at least one member has also been quaternized at least in part by one or more members of the group consisting of methyl, ethyl, and n-propyl chlorides, iodides and bromides, dimethyl sulfate, cyclohexyl chloride, bromide and iodide.

4. An anion exchange membrane which is the product of a process comprising quaternizing at least in part at least one member of the group consisting of compounds represented by the formula

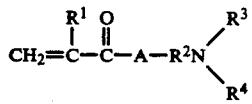

where $R^1$ represents a methyl group or hydrogen, A represents —O— or —NH—, $R^2$ represents a saturated alkylene group, $R^3$ and $R^4$ represent alkyl groups, with one or more members of the group consisting of vinyl chloride polymers, vinyl chloride copolymers, chlorinated rubbers, rubber hydrochlorides, chlorinated rubber hydrochlorides, chlorobutyl rubbers, bromobutyl rubbers, chlorinated polyethylene rubbers, chlorosulfonated polyethylene rubbers, epichlorohydrin rubbers and neoprene rubbers, simultaneously and/or subsequently polymerizing said at least one member which has been so quaternized and any of said at least one member which has not been so quaternized thereby forming a polymerizate of said at least one member and subsequently treating said polymerizate with an alkyl halide.

5. An anion exchange membrane which is the product of a process comprising quaternizing at least in part at least one member of the group consisting of tertiary amine substituted methacrylate esters, tertiary amine substituted acrylate ester, tertiary amine substituted methacrylamides, tertiary amine substituted acrylamides with one or more members of the group consisting of vinyl chloride polymers and copolymers, chlorinated rubbers, rubber hydrochlorides, chlorinated rubber hydrochlorides, chlorobutyl rubbers, bromobutyl rubbers, chlorinated polyethylene rubbers, chlorosulfonated polyethylene rubbers, epichlorohydrin rubbers and neoprene rubbers, simultaneously and/or subsequently vinyl polymerizing said at least one member which has been so quaternized, any of said at least one member which has not been so quaternized and a divinyl monomer thereby forming a polymerizate of said at least one member and said divinyl monomer and subsequently treating said polymerizate with an alkyl halide.

6. An anion exchange membrane which is the product of a process comprising quaternizing at least in part at least one member of the group consisting of compounds represented by the formula

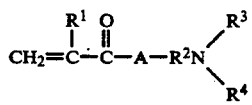

and by the polymers and copolymers and thereof where $R^1$ represents a methyl group or hydrogen, A represents —O— or —NH—, $R^2$ represents a saturated alkylene group, $R^3$ and $R^4$ represent alkyl groups, said at least one member quaternized at least in part by one or more members of the group consisting of vinyl chloride polymers and copolymers, chlorinated rubbers, rubber hydrochlorides, chlorinated rubber hydrochlorides, chlorobutyl rubbers, bromobutyl rubbers, chlorinated polyethylene rubbers, chlorosulfonated polyethylene rubbers, epichlorohydrin rubbers and neoprene rubbers in the presence of one or more plasticizers for the one or more members of said last mentioned group thereby forming an adduct of at least part of said first mentioned group with said second mentioned group and treating such adduct with an alkyl halide.

* * * * *